United States Patent [19]
Sakaguchi et al.

[11] 3,954,330
[45] May 4, 1976

[54] FILM GATE UNIT FOR MOTION PICTURE APPARATUS

[75] Inventors: Keiichi Sakaguchi; Noritsugu Hirata, both of Yokohama, Japan

[73] Assignee: Canon Kabushiki Kaisha, Tokyo, Japan

[22] Filed: Sept. 19, 1974

[21] Appl. No.: 507,434

Related U.S. Application Data

[63] Continuation of Ser. No. 302,430, Oct. 31, 1972, abandoned.

[30] Foreign Application Priority Data
Nov. 17, 1971 Japan.............................. 46-107524

[52] U.S. Cl. ................................................ 352/224
[51] Int. Cl.² ........................................... G03B 1/48
[58] Field of Search........................... 352/221, 224

[56] References Cited
UNITED STATES PATENTS

| | | | |
|---|---|---|---|
| 2,464,180 | 3/1949 | Jacobson | 352/224 |
| 2,995,974 | 8/1961 | Kirk | 252/224 X |
| 3,612,672 | 10/1971 | Carlso | 352/221 |

*Primary Examiner*—Monroe H. Hayes
*Attorney, Agent, or Firm*—William R. Woodward

[57] ABSTRACT

A film gate formed as one integral unit by molding a black synthetic resin material includes a film gate portion, a recess for receiving a film driving member for reciprocal movement therein, film guide walls, positioning means and protective walls to protect resilient side pressure members from damage from careless loading of a film magazine. The positioning means may be used as reference position to secure the gate unit to a fixed frame of a motion picture apparatus. The side pressure members are formed as extensions of a holding member that also applies resilient force to the film driving member near the root of its film-advancing pawl.

9 Claims, 8 Drawing Figures

3,954,330

FILM GATE UNIT FOR MOTION PICTURE MACHINES

This is a continuation of application Ser. No. 302,430, filed Oct. 31, 1972, now abandoned.

BACKGROUND OF THE INVENTION

1. Field of the Invention

This invention relates to a film gate unit for motion picture apparatuses, and more particularly to a film gate unit integrally formed of synthetic resin by molding.

2. Description of the Prior Art

In cinecameras, motion picture projectors or the like, it is well-known that intermittent feeding of unexposed or exposed film supported on a certain surface should desirably be accomplished by slide-contacting such film onto a film gate having a surface of excellent surface precision and very low friction coefficient.

For this purpose, the conventional film gate required a particularly high machining accuracy and the assembly of such a film gate to a motion picture apparatus has involved minute care to ensure that the gate will be positioned within the film aperture in the focal plane of the lens and to warrant the high precision with which the film gate is oriented along the optical axis. Especially, a film gate for use with cinecameras has required the surface thereof to be subjected to a light-intercepting treatment and further coated with a black pigment. Thus, the formation and assembly of the conventional film gate has been very complicated and costly.

Most film gates of the prior art have been manufactured by die-casting a material into a predetermined shape, thereafter machining the thus shaped material and subjecting it to a finishing process, and black-plating it. Then, these film gates have been secured to mounting base plates by means of screws. To enhance the accuracy with which the film gates are secured to the base plates, positioning pins which also serve as guide pins for film have been studded in the base plates so that such pins may be used as the reference to mount the film gates to the base plates. Thus, the mounting of the film gates has required the provision of guide pins studded in the base plates and this has added much to the cumbersome procedures and accordingly aggravated the inefficiency of the machining and assembly. Such film gates have been unsuitable for assembling quantities of them, and necessarily incurred higher expenses.

SUMMARY OF THE INVENTION

It is an object of the present invention to eliminate all the disadvantages noted above with respect to the prior art.

It is another object of the present invention to provide a film gate unit by molding a black synthetic resin material into an integral unit having a film gate and a base plate wall, which may be secured to a camera's frame to thereby mount the film gate to the camera.

It is still another object of the present invention to provide a film gate unit by molding a black synthetic resin material into an integral unit having a film gate, a recess for receiving film feed means for reciprocal movement therein, film guide means and positioning means which may be used as reference position to secure the unit to a fixed frame of a motion picture apparatus.

BRIEF DESCRIPTION OF THE DRAWINGS

Other objects of the present invention will become apparent from the following detailed description taken in conjunction with the accompanying drawings, in which.

DESCRIPTION OF THE PREFERRED EMBODIMENTS

Figure 1:
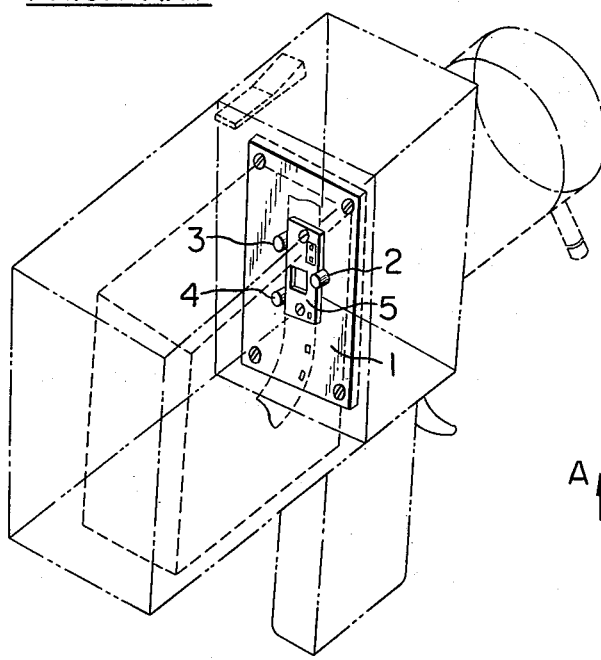
FIG. 1 schematically illustrates the essential portions of the film gate according to the prior art.

Referring to FIG. 1, there is shown a conventional mount construction for the film gate of cinecamera. A film gate mounting base plate 1 is secured to a camera's frame by means of screws and has guide pins 2, 3 and 4 studded therein at predetermined points. A film gate 5 is positioned so as to be held by and between the three guide pins, thereafter it is secured by means of screws. Thus, in order to mount the film gate, the prior art has required the guide pins to be studded in the base plate 1 and also involved complicated works such as screwing and the like for assembly, as well as machine procedures. This has been seriously inefficient and especially unsuitable for assembling a large quantity of such articles and has unavoidably given rise to higher increased productions cost.

Furthermore, prior to being secured to the base plate 1, the film gate 5 must be subjected to a surface treatment for providing a uniform surface, precision of the gate surface on which a film is to run, and, in addition, the film gate surface must be black-plated to prevent the sensitive film surface from being fogged with undesirable reflected light. Thus, the conventional film gate has involved cumbersome treatment and assembling works, so that it has been unsuitable for industrialized mass-production.

Figure 3:
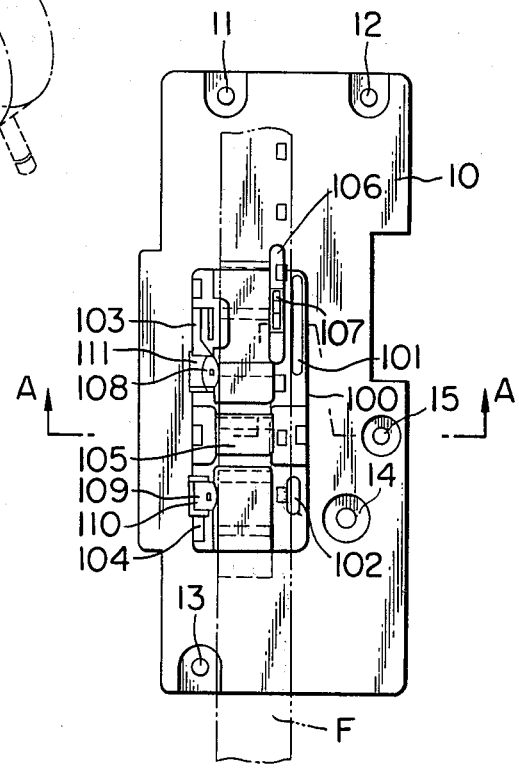
FIG. 3 is a front view of the unit shown in FIG. 2.
Figure 2:
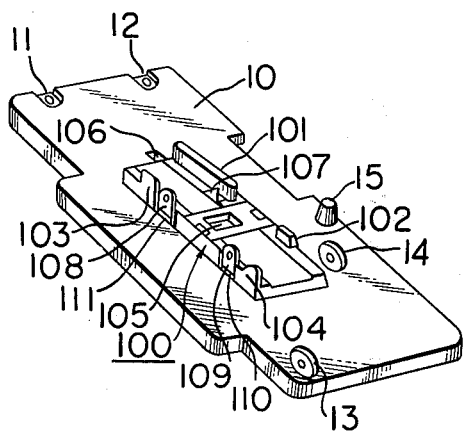
FIG. 2 is a perspective view showing the entire structure of the gate unit according to the present invention.

Referring now to FIGS. 2 and 3, there is shown a gate unit integrally formed with a film gate portion according to the present invention, particularly the surface side of such gate unit on which the film is to be contacted. Various parts shown in these drawing figures are integrally formed of a synthetic resin material by the molding technique.

A base plate of black synthetic resin is generally designated by 10 and includes a film gate portion 100 formed in the centerpart thereof constituting a flat and raised discrete section with respect to the base plate 10. A plurality of threaded holes 11, 12, 13 and 14 for receiving base plate mounting screws are formed in the side edges of the base plate 10. The open end portion of each of these threaded holes is so as recessed so as to prevent the head of a corresponding screw from jutting outwardly from the surface of the base plate 10. The diameter of each threaded hole 11, 12, 13, 14 is greater than that of the corresponding screw so that the base plate 10 may be secured to a camera's frame with reference positioning members on the back side of the base plate serving as a reference position, as will be described further. A projecting member 15 is provided on the base plate 10 and serves to locate a magazine of the type which contains therein a film to be charged (see magazine M in FIG. 6), such as Super 8 film magazine available from Eastman Kodak of the United States. However, if the magazine in use is not of such type, the projecting member 15 may be eliminated. Film guide side walls 101 and 102 are projectingly formed on one side edge of the film gate portion 100, and protective walls 103 and 104 are projectingly formed on the other side edge of the film gate portion in opposed relationship with the guide side walls 101 and 102. The protective walls 103 and 104 prevents side pressure springs 108 and 109, which will be described, from being inadvertently deformed by the magazine when the latter is inserted into the base plate. The side pressure springs 108 and 109 project inwardly and are held in registry with respect to through-apertures 111 and 110 formed in the protective walls 103 and 104, and urge the film edgewise against the side walls 101 and 102. A slit opening 106 is formed in the base plate and has a sufficient length for a feed pawl 107 to feed the film F (imaginary lines in FIG. 3) by an amount corresponding to one film frame.

Figure 5:
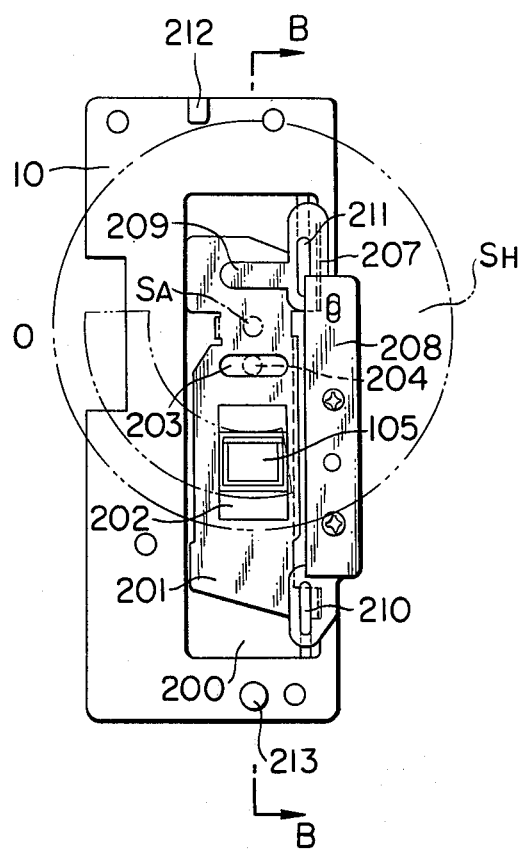
FIG. 5 is a plan view showing the back side of the film gate unit shown in FIG. 2.
Figure 6:
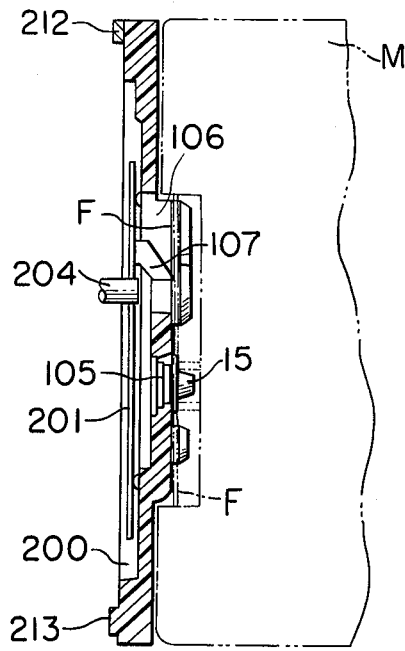
FIG. 6 is a longitudinal cross-sectional view of the gate unit taken along the line B—B' of FIG. 5.

FIGS. 5 and 6 show the back side of the base plate 10 and a cross section thereof, respectively. A rectangular-shaped recess 200 is formed in the back side of the base plate and loosely receives therein a film feed pawl drive member 201, a portion of which is formed into the feed pawl 107 bent at 90° toward the back side of the base plate, as seen in FIG. 6. The feed pawl 107 extends through the slit opening 106 to the surface of the film gate 100. An opening 202 for the film aperture and a slot 203 for reciprocal movement of the drive member are formed in the middle of the drive member 201. The opening 202 has an axial length sufficiently great not to shield the aperture 105 during reciprocal movement of the drive member 201. The slot 203 receives therein an eccentric pin 204 (dotted circle) studded in a shutter blade SH at a location thereof which is eccentric with respect to the rotary shaft SA of the shutter blade driven to rotate and having an opening O, so that the drive member 201 may be vertically reciprocated under the circular movement of the pin 204.

Figure 4:
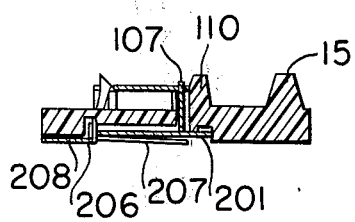
FIG. 4 is a sectional view of the gate unit taken along the line A—A' of FIG. 3.
Figure 7:
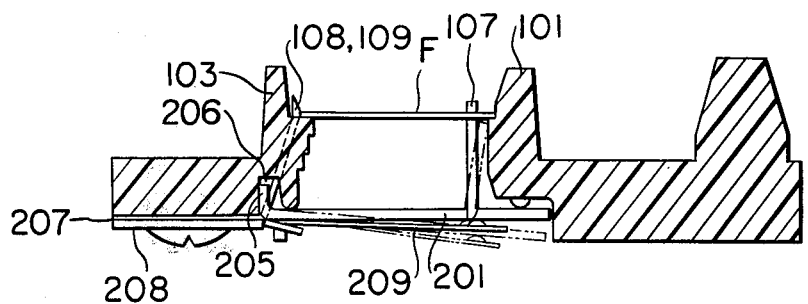
FIG. 7 illustrates operations of the film gate unit shown in FIG. 2.
Figure 8:
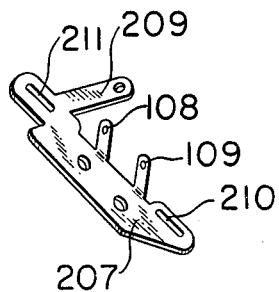
FIG. 8 is a perspective view showing the construction of the holder member used with the unit of FIG. 2.

One side edge of the drive member 201 is bent at 90° toward the surface of the base plate as indicated at 205 in FIGS. 4 and 7, and received in a straight groove 206 formed along the inner side edge of the recess 200 so that the drive member 201 may be guided rectilinearly in the recess 200. As shown in FIGS. 4 and 7, a holder member 207 is secured to the back side of the base plate 10 by means of a fixing plate 208 and formed of a spring plate which is configured as shown in FIG. 8. The holder member 207 has a portion 209 extending over the drive member 201 received in the recess 200. The opposite end portions 210 and 211 of the holder member 207 each having a pressed step portion provide pressure arms for holding the side edge portions of the drive member 201 between themselves and the bottom surface of the base plate. Reference positioning members 212 and 213 are projectingly formed on the back side of the base plate 10 and may be used to position and secure the base plate 10 with respect to the frame of a camera or the like by inserting such reference positioning members into mating holes preformed in the frame. The above-described film gate portion 100 and film aperture and other gate components are all shaped and processed with the positioning members 212 and 213 as the reference.

In order that the gate unit constructed in the described manner may be secured, for example, to a compact cinecamera as shown in FIG. 1, the base plate 10 is secured to a camera's fixed frame (not shown). Such frame must be formed with mating holes for receiving the projecting reference positioning members 212 and 213 on the back side of the base plate 10 so as to position and fix the base plate at a predetermined position in the camera. With the base plate positioned by the reference positioning members 212 and 213 and with the eccentric pin 204 of the camera received in the slot 203 of the drive member 201, the base plate 10 is secured to the camera's frame by screws threaded into the threaded holes 11, 12, 13 and 14. This completes the assembly of the gate unit to the camera. Thereafter, a film F is disposed on the gate unit in the manner as shown in FIG. 3. When the drive member 201 is reciprocated by the eccentric pin 204, the feed pawl 107 during its forward stroke within the slit opening 106 engages a perforation in the film F to feed the film F by an amount corresponding to one film frame. During the backward stroke of the feed pawl 107, the camming member thereof is urged by the film F so that the drive member 201 is tilted against the resilient pressure from the portion 209 of the holder member 207 and moved backwardly in such tilted condition. The forward movement of the drive member 201 occurs rectilinearly with one side thereof urged into the straight groove 206 by the portion 210 and 211 of the holder member 207. When the drive member 201 has completed its backward stroke to register with the next perforation in the film F, the drive member 201 is again engaged with this perforation by the resilient force of the holder member 209 and subsequently feeds the film by another frame during the forward stroke of the drive member. In the meantime, the film is fed while being urged against the guide side walls 101 and 102 by the resilient force of the side pressure springs 108 and 109, thus completely eliminating the lateral vibrations of the film frame during the feeding of the film.

According to the present invention, as has been described hitherto, the film gate unit is integrally formed of black synthetic resin by the molding technique and has a recess in the back side thereof for receiving a drive member adapted for rectilinear reciprocation. Thus, various film gate components can be formed integrally and simultaneously with one another and the resultant film gate unit is quite compact. Moreover, the use of black synthetic resin as the material of the gate eliminates the requirements of surface treatment and other processes, which means very great advantages in manufacturing cost and assembling works. Thus, the film gate unit of the present invention is highly effective for use in motion picture cameras of types designed for mass production.

In the above-illustrated embodiment, the reference positioning members 212 and 213 were especially provided on the back side of the base plate 10, whereas at least one of the threaded holes 11–14 used to fix the base plate may be adapted to tightly receive a positioning screw. Such particular threaded holes may be utilized as the reference means for locating the various gate components, with the same result as that described above.

In the above-described construction of the present invention, the film F moves on the corresponding surface of the gate unit with one side edge of the film guided along the guides 101 and 102 and the other side edge urged by the spring members 108 and 109. Where the film in use is of the type contained in a magazine, the engagement of the film surface with the corresponding surface of the gate unit during the movement of the film must be established by using a pressure plate in the magazine in such a manner that the pressure plate urges the film against the corresponding surface of the film gate when the magazine is positioned by the positioning pin 15 and urged into contact with the base plate 10. Where no magazine is used, it is necessary to provide a pressure plate for urging a film against the corresponding surface of the film gate, but such a pressure plate is known and conventional with 8mm and other types of cinecameras and the details thereof need not be described herein.

Thus, the present invention provides a film gate as one unit and this is highly effective for minimizing the labor and procedures required to process and assemble film gates to motion picture apparatuses.

We claim:

1. A film gate unit incorporated in a cinematographic apparatus of a type having a magazine chamber for accommodating a film magazine loaded with cinematographic film, and provided with a film advancing mechanism capable of conveying said film loaded in said magazine chamber, which comprises in combination:

a. a base plate (10) forming one side wall of said magazine chamber, said base plate having the following component members integrally molded therewith of a black synthetic resin of the same quality:
  1. a film gate portion (100) raised at the center part of said base plate and whose front surface is formed in a flat planar shape, one portion of said film gate being provided with a film exposure aperture (105) perforated in a rectangular shape through said base plate;
  2. film guiding side walls projectingly provided at one side edge of said film gate portion along the travelling path of said film, said film guiding side walls comprising at least first (101) and second (102) separate side walls in positions bracketing said film aperture;
  3. a slit (106) for allowing a film advancing pawl to project therethrough, which slit extends in the travelling direction of said film, and is perforated through said base plate along said film gate portion of said base plate;
  4. through-holes for side pressure spring members, said through-holes being perforated through said base plate and including at least first (110) and second (111) through-holes disposed at different positions bracketing said film aperture substantially opposite said first and second walls, respectively, and respectively across the film travelling path therefrom;
  5. protective walls projectingly provided, on the margin of said film travelling path, including at least a first (103) and a second (104) protective wall at positions with their film gate sides substantially collinear with said through-holes and positioned respectively on the film arrival and film exit sides of the through-hole group, so as to protect side pressure spring members projecting through said through-holes; and
  6. a rectangular cavity (200) formed on the rear surface of said base plate opposite to the front surface where said film gate portion is provided;

b. a drive member for intermittently advancing said film at said film gate portion, said drive member being movably mounted within said rectangular cavity so as to be capable of sliding for back-and-forth sliding movement in alignment with the travelling direction of said film, and having the following members integrally formed therewith of a resilient material:
  1. a drive member plate (201), at the center of which there are perforated an opening (202) for film exposure disposed at a position corresponding to said base plate film exposure aperture and having its long side in the film travelling direction, the size of said opening being such that, when said drive member performs reciprocating sliding movement, it does not intercept light passing through said film exposure aperture provided in said base plate, and a slot (203) for reciprocatingly driving said drive member;
  2. a film advancing pawl (107) bent from one side edge part of said drive member plate at approximately a right angle toward the rear surface of said base plate, said film advancing pawl projecting outwardly to the front surface of said film gate portion through said slit provided for the film advancing pawl and being capable of entering into a perforation of said film disposed in said film gate portion, and said pawl having, in the portion able to enter into said perforations, an edge on the film exit side at approximately right angles to the film surface and, on the film arrival side, an edge oblique to said film surface; and c. a holding member (207) to hold said drive member in said rectangular cavity of said base plate, said holding member being disposed along the side edge of the drive member opposite the edge thereof from which said film advancing pawl extends, and having the following component members integrally formed therewith of a resilient material:
  1. a fixing portion for maintaining and positioning said holding member at the rear surface of said base plate;
  2. an extension (209) extending from said fixing portion, so that the free end of said extension contacts said drive member at a position thereof close to the locus, along which said film advancing pawl is shifted in the film travelling direction in such a manner that, when said drive member is subjected to its reciprocating slide movement, said extension may exert a force to cause said film advancing pawl to project from said film gate front surface in said locus;
  3. side pressure portions for urging an edge of said film towards said film guiding walls when said film travels on said film gate portion, said side pressure portions being bent from said fixing portion toward the rear surface side of said base plate, and including a first side pressure portion (109) projecting past said film gate front surface through said first through-hole to constitute a side pressure spring member, and a second side pressure portion (108) projecting past said film gate front surface through said second through-hole to constitute a second side pressure spring member, said first and second side pressure portions being spring-energized to exert a force in the direction of said film guiding side walls (101,102);

4. supporting members (210,211) for shifting said drive member with the other side edge part opposite to the side edge part where said film advancing pawl is provided and for operating as fulcrum for said drive member to allow the drive member to swing when said drive member and the film advancing pawl thereof are subjected to reciprocating movement and a force tending to urge the tip of said pawl back into said film gate portion of said base plate is exerted by engagement between the tip end of said film advancing pawl and the edge of a film perforation or the portion of film between perforations, at least part of said respective supporting members being spring-energized in the direction of the rear surface of said base plate and thereby holding said drive member at said base plate, while it swings on said supporting members as a fulcrum, whereby, when a drive member control means (204) of said cinematographic apparatus engaged with said slot (203) for reciprocatingly driving said drive member is actuated, and said reciprocatingly sliding movement of said drive member takes place, said film advanced by said perpendicular edge of said film advancing pawl facing the exit direction of said film at the time of its forward movement, and a force to shift the tip of said film advancing pawl into said film gate portion of said base plate is exerted at the edge of said film perforation where said inclined surface of said film advancing pawl makes contact therewith at the time of its backward movement, in consequence of which said drive member oscillatingly shifts with said supporting member as the fulcrum to cause said film advancing pawl to escape into said slit in film gate portion of said base plate, and, further, during said backward movement of said pawl, said film is maintained by said film guiding side walls and said side pressure of said holding member portions so as not to move from its position in said film gate portion, and, at the same time, said protective wall protects said side pressure portion of said holding member from any possible deformation due to forcing by said magazine by improper loading of said magazine.

2. The film gate unit as claimed in claim 1, wherein said holding member (207) is fixed to the rear surface of said base plate through a fixing member (208), which is disposed in such a manner that it overlaps at least part of said fixing portion of said holding member, and that it extends along one side edge of said rectangular cavity.

3. The film gate unit as claimed in claim 1, wherein the projection height of said protective walls projecting from said base plate is made higher than the projection height of the side pressure portions of said holding member projecting from the film gate surface.

4. The film gate unit as claimed in claim 1, wherein projection height of said film guiding side walls projecting from said base plate is made higher than the projection height of said film advancing pawl of said drive member projecting from said film gate surface.

5. The film gate unit as claimed in claim 1, wherein there is provided a positioning member (15) for engagement with a positioning cavity to be provided on the corresponding surface of a film magazine, and for thereby disposing said film magazine at a predetermined position with respect to said base plate.

6. In a film gate unit for use in a cinematographic apparatus of a type having a magazine chamber for accommodating a film magazine loaded with a cinematographic film, wherein there are provided a base plate disposed on a wall of said chamber having a film exposure portion for exposing a portion of film located between the frame walls forming said magazine chamber, said base plate having a side wall projecting along one side of a predetermined path, through which said film travels, and carrying side pressure members mainly disposed on the rear surface side of said base plate but having one part of each side pressure member projecting through said base plate beyond the front surface thereof alongside said film path on the other side thereof from said side wall provided alongside said film path and opposite thereto, said film being urged to said side wall by the projecting portions of the side pressure member, and being maintained thereby in position for exposure during the stoppage portion of the film advance cycle, the IMPROVEMENT which comprises in combination:

a. a base plate having formed integrally therewith:
1. film gate portion (100) raised at the center of said base plate, and whose surface is formed in a flat planar shape, one part of said film gate portion being provided with a film exposure aperture (105) perforated in a rectangular shape through said base plate;
2. side walls comprising at least a first side wall (101) and a second side wall (102) disposed at different positions separated so as to bracket said film aperture at one side thereof;
3. a slit (106) for a film advancing pawl which extends in the travelling direction of said film, and is perforated through said base plate along said film gate portion of said base plate;
4. through-holes for the side pressure members perforated through said base plate at the side of said film path opposite the side formed by said side walls, said through-holes including at least a first through-hole (110) and a second through-hole (111) disposed at different positions separated from each other so as to bracket said film aperture at one side thereof;
5. protective walls projectingly provided with their film gate sides arranged substantially linearly with said through-holes, said protective walls comprising at least a first protective wall (103) and a second protective wall (104) disposed at different positions, being separated so as to bracket said first and second through-holes and protect the side pressure members projecting therethrough; and
6. a rectangular cavity (200) for freely mounting one part of said drive member in a condition capable of reciprocatingly sliding with respect to said film travelling direction, said cavity being formed on the rear surface of said base plate opposite to the surface where said film gate portion is provided;

b. a reciprocatingly movable driving plate member provided in said rectangular cavity of said base plate and having substantially at an edge thereof a film advancing pawl extending therefrom at approximately a right angle and arranged to pass through said slit, and c. a holding member of resilient material held on the rear surface of said base plate behind said drive plate member in such a manner as to exert a force urging said pawl to project through said slit and to allow said drive plate member to pivot on a line near its edge opposite that from which said pawl extends when the tip of said pawl is pressed into said slit against said urging force, said holding member also having resilient extensions arranged to pass through said through-holes of said base plate and to exert a side pressure force on a film when a film is present in the film gate.

7. The film gate unit as claimed in claim 6, wherein said base plate is formed of a black synthetic resin of uniform quality throughout the base plate and features integral therewith.

8. The film gate unit as claimed in claim 6, wherein height of said protective walls projecting from said base plate is made higher than the height of said resilient extensions (108,109) of said holding member projecting from said film gate surface.

9. The film gate unit as claimed in claim 6, wherein height of said side walls projecting from said base plate is made higher than the height of said film advancing pawl of said drive member projecting from said film gate surface.

* * * * *